United States Patent
Ewig et al.

(10) Patent No.: US 10,033,190 B2
(45) Date of Patent: Jul. 24, 2018

(54) INVERTER WITH AT LEAST TWO DC INPUTS, PHOTOVOLTAIC SYSTEM COMPRISING SUCH AN INVERTER AND METHOD FOR CONTROLLING AN INVERTER

(71) Applicant: SMA Solar Technology AG, Niestetal (DE)

(72) Inventors: Carsten Ewig, Kassel (DE); Dietmar Meerwart, Eschwege (DE)

(73) Assignee: SMA Solar Technology AG, Niestetal (DE)

( * ) Notice: Subject to any disclaimer, the term of this patent is extended or adjusted under 35 U.S.C. 154(b) by 219 days.

(21) Appl. No.: 14/996,580

(22) Filed: Jan. 15, 2016

(65) Prior Publication Data

US 2016/0134120 A1    May 12, 2016

Related U.S. Application Data

(63) Continuation of application No. PCT/EP2014/065452, filed on Jul. 17, 2014.

(30) Foreign Application Priority Data

Jul. 19, 2013   (DE) .................. 10 2013 107 721

(51) Int. Cl.
| | |
|---|---|
| *H01F 27/42* | (2006.01) |
| *H02J 3/38* | (2006.01) |
| *H02M 3/04* | (2006.01) |
| *H02M 7/44* | (2006.01) |
| *H02M 1/00* | (2006.01) |

(52) U.S. Cl.
CPC ............. *H02J 3/383* (2013.01); *H02M 3/04* (2013.01); *H02M 7/44* (2013.01); *H02M 2001/007* (2013.01); *Y02B 10/14* (2013.01); *Y02E 10/563* (2013.01)

(58) Field of Classification Search
USPC ........................................ 307/104
See application file for complete search history.

(56) References Cited

U.S. PATENT DOCUMENTS

| | | | |
|---|---|---|---|
| 8,289,730 B2 | 10/2012 | Gurunathan et al. | |
| 9,611,836 B2 * | 4/2017 | Kurthakoti Chandrashekhara ... | F03D 9/255 |

(Continued)

FOREIGN PATENT DOCUMENTS

| | | |
|---|---|---|
| CN | 102237691 A | 11/2011 |
| DE | 102006023563 | 11/2007 |

(Continued)

*Primary Examiner* — Adam Houston
(74) *Attorney, Agent, or Firm* — Eschweiler & Potashnik, LLC

(57) ABSTRACT

The disclosure relates to an inverter with at least two DC inputs, which are coupled to a common DC link, which is connected to an inverter bridge. At least one of the DC inputs is coupled to an additional DC link. The disclosure also relates to a PV system comprising such an inverter and to a method for controlling such an inverter of a PV system, wherein a power flow from at least one of the DC inputs is directed into the common DC link and/or into the additional DC link on the basis of suitably coordinated control of the DC-DC converter and of an additional DC-DC converter allocated to the additional DC link.

21 Claims, 2 Drawing Sheets

(56) References Cited

U.S. PATENT DOCUMENTS

| | | | |
|---|---|---|---|
| 2009/0244947 A1* | 10/2009 | Fornage | H02M 1/32 363/136 |
| 2011/0273022 A1 | 11/2011 | Dennis et al. | |
| 2012/0081938 A1* | 4/2012 | Kuenzel | H02M 1/126 363/123 |
| 2012/0163044 A1* | 6/2012 | Mayor Miguel | H02M 7/49 363/37 |
| 2012/0281444 A1* | 11/2012 | Dent | H02M 7/53871 363/56.01 |
| 2013/0121041 A1* | 5/2013 | Schroeder | B60L 15/007 363/37 |
| 2014/0084876 A1* | 3/2014 | Ramorini | H02M 3/1588 320/166 |
| 2016/0134120 A1* | 5/2016 | Ewig | H02M 3/04 307/82 |
| 2016/0146192 A1* | 5/2016 | Kurthakoti Chandrashekhara et al. | F03D 9/003 290/44 |
| 2016/0233776 A1* | 8/2016 | Nielsen | H02M 3/33584 |
| 2016/0254783 A1* | 9/2016 | Unru | G01R 31/42 324/658 |
| 2016/0268951 A1* | 9/2016 | Cho | H02P 27/14 |
| 2016/0322828 A1* | 11/2016 | Vogel | H02J 7/0068 |
| 2017/0025965 A1* | 1/2017 | Ramabhadran | H02M 3/33592 |
| 2017/0047739 A1* | 2/2017 | Berger | H02J 1/102 |
| 2017/0077857 A1* | 3/2017 | Chretien | H02P 1/426 |
| 2017/0117816 A1* | 4/2017 | Ohta | H02M 5/458 |
| 2017/0237355 A1* | 8/2017 | Stieneker | H02M 3/33546 363/17 |
| 2017/0279372 A1* | 9/2017 | Sakakibara | H02M 7/48 |
| 2017/0310235 A1* | 10/2017 | Sakakibara | H02M 5/4585 |
| 2018/0029484 A1* | 2/2018 | Boesing | B60L 11/1814 |
| 2018/0064001 A1* | 3/2018 | Ledezma | H05K 7/20936 |

FOREIGN PATENT DOCUMENTS

| | | |
|---|---|---|
| DE | 20212101240 A1* | 7/2013 |
| EP | 2738927 A4 | 12/2014 |

\* cited by examiner

INVERTER WITH AT LEAST TWO DC INPUTS, PHOTOVOLTAIC SYSTEM COMPRISING SUCH AN INVERTER AND METHOD FOR CONTROLLING AN INVERTER

CROSS REFERENCE TO RELATED APPLICATIONS

This application claims priority to International Patent Application number PCT/EP2014/065452, filed on Jul. 17, 2014, which claims priority to German Patent Application number 10 2013 107 721.8, filed on Jul. 19, 2013, and is hereby incorporated in its entirety.

FIELD

The disclosure relates to an inverter with at least two DC inputs, which are coupled to a common DC link, which is connected to an inverter bridge. The disclosure also relates to a photovoltaic system comprising such an inverter and to a method for controlling such an inverter.

BACKGROUND

Inverters are used, for example, in photovoltaic systems, abbreviated below to PV systems, to convert a DC current generated by a PV generator into an AC current suitable for feeding into a power grid. Most of the PV systems installed on buildings, in particular on residential buildings, are currently designed to feed into a public power grid. Situations can arise during operation of such a PV system, however, in which there is more locally produced power available than can be fed into the public power grid at that moment in time. In such a situation, a power supply company (PSC) which provides and/or looks after the public power grid can transmit a request to throttle down the PV system, as a result of which the maximum power to be fed in from the PV system is limited or any feed-in is completely prohibited. Electronic communication systems, for example, which are connected to the inverter of a PV system, are known for transmitting such a throttle-down request. The inverter can throttle down the fed-in power easily by varying the operating point of the PV generator either towards the open-circuit voltage or towards the short-circuit voltage of the PV generator. Renewable energy that can actually be used remains unused, however, in this situation.

Even when there is no throttle-down request from the power supply company, it may be increasingly attractive, because of a falling level of feed-in tariff, not to feed the energy generated locally by the PV generator into the public power grid but to use this energy to cover a private power consumption.

SUMMARY

The present disclosure is directed to an inverter, a PV system comprising such an inverter and a control method for such an inverter that easily allow surplus PV energy to be utilized in the most energy-efficient manner possible. In particular such utilization shall be possible without having to install additional metering and control equipment for ensuring that the amount of energy fed into the public power grid does not exceed a defined level.

According to a first aspect of the disclosure, this object is achieved by an inverter of the type mentioned in the introduction, in which at least one of the DC inputs is coupled to an additional DC link.

It is possible to use the additional DC link for the purpose of utilizing surplus energy by directing energy from the PV generator from at least one PV sub-generator into this additional DC link and using the energy from there. An additional PV sub-generator can at the same time continue to feed its generated electrical power into the power grid via the inverter. By diverting the power into the additional DC link, the power fed into the power grid can be reduced or taken to zero, and hence it is possible to respond to any throttle-down request from an energy supplier without the surplus energy remaining unused. Only a small amount of additional equipment is needed to do this.

The additional DC link can be arranged inside an enclosure of the inverter or else can be arranged in a separate enclosure as part of an expansion unit. The latter option is particularly suitable if a retrofit unit is used to add the additional DC link to an existing inverter.

In an advantageous embodiment of the inverter, the additional DC link is connected to the DC inputs via switches and/or diodes. The connection to the additional DC link can be made in this case directly to the DC inputs or else to a suitable point inside a DC-DC converter, e.g. a boost converter, arranged between the DC inputs and the common DC link of the inverter. In one embodiment such a DC-DC converter comprises two outputs, of which one output is connected to the common DC link and an additional output is connected to the additional DC link. If, for example, the DC-DC converter is in the form of a boost converter, a center tap between an inductor in the boost converter and a switching element in the boost converter can, in one embodiment, be coupled to the output and to the additional output by a diode in each case. This allows current to flow from the DC inputs into the common and/or additional DC link without, however, a reverse current being able to flow from one of the DC links into the other. If a current between the DC links is required in one direction e.g. from the additional DC link into the common DC link, this can be achieved by an additional current path which connects the two DC links and contains a diode.

In another advantageous embodiment of the inverter, the additional DC link is coupled via an additional DC-DC converter. In one embodiment the additional DC-DC converter is a buck converter, a boost converter or a combined buck-boost converter. Even when the DC-DC converter and the additional DC-DC converter are arranged between the DC input and the additional DC link, only one of the two is actively needed when power is flowing out of the relevant PV sub-generator into the additional DC link. Corresponding power losses hence arise only once, and the loads connected to the additional DC link are supplied in the most energy-efficient manner possible (i.e. with minimum possible power loss).

In order to achieve coordinated control of all the components for controlling the power flow from the PV generator into the DC link and/or the additional DC link, a control unit of the inverter is disclosed to control the switches and/or the additional DC-DC converter.

In another advantageous embodiment of the inverter, an additional inverter bridge is connected downstream of the additional DC link. The additional DC link can thereby be used not only to supply a DC load but also to supply an AC load.

According to another aspect of the disclosure, a PV system comprises such an inverter, wherein the additional DC link is connected to a local electrical load and/or to an energy store. The local electrical load may be a local DC load or, by inserting an additional inverter bridge, a local AC load. In one embodiment the local DC load and/or the local AC load may be components of a heating system, in particular may be an electrical heating element and/or an electrical circulating pump. Thus surplus power from the PV generator can be used in a practical manner to operate components that serve to store energy in the form of heated water.

According to a further aspect of the disclosure, a method for controlling an inverter of a PV system is disclosed. The inverter comprises at least two DC inputs, which are coupled to a common DC link, which is connected to an inverter bridge, wherein at least one of the DC inputs is connected to the common DC link via a DC-DC converter, and at least one of the DC inputs is coupled via an additional DC-DC converter to an additional DC link to which a local electrical load can be connected. In the method a power flow from at least one of the DC inputs is directed into the common DC link and/or into the additional DC link on the basis of suitably coordinated control of the DC-DC converter and of the additional DC-DC converter. This results in the advantages described in connection with the inverter.

In one embodiment of the method, the entire power flow from the at least one of the DC inputs is directed selectively either into the common DC link or into the additional DC link, at least for a certain time period, on the basis of suitably coordinated control of the DC-DC converter and of the additional DC-DC converter.

In another embodiment of the method, however, the power flow from the at least one of the DC inputs is directed both into the common DC link and into the additional DC link simultaneously, at least for a certain time period and, if applicable, in different proportions, on the basis of suitably coordinated control of the DC-DC converter and of the additional DC-DC converter.

In another embodiment of the method, each partial power flow from one of the DC inputs into the common DC link or the additional DC link is conducted only via one actively converting DC-DC converter or additional DC-DC converter at a time. Thus the most effective use possible of the energy supplied to the inverter is achieved by suitable control of the DC-DC converters, in which multiple conversion losses are prevented. In one embodiment the DC-DC converters are controlled such that even when the voltages at the DC inputs and at the common DC link or the additional DC link are different, only one voltage conversion is performed in each of the partial power flows.

BRIEF DESCRIPTION OF THE DRAWINGS

The disclosure is explained in more detail below using example embodiments with reference to two figures, in which:

FIG. 1 shows in the form of a circuit diagram a PV system comprising an inverter according to the disclosure having an expansion unit in a first example embodiment.

DETAILED DESCRIPTION

Figure 1:
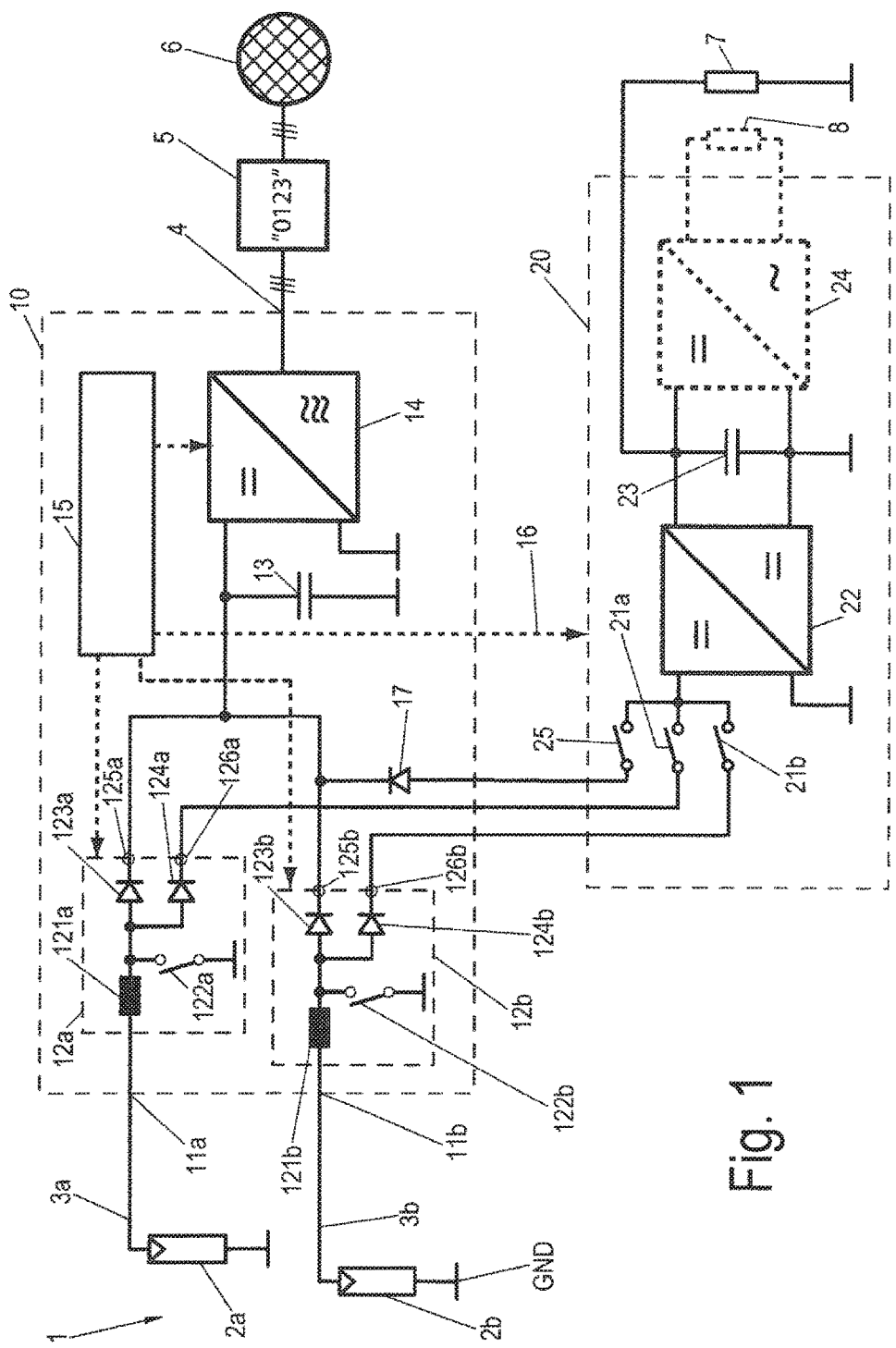
FIG. 1 is a circuit diagram of a PV system comprising an inverter according to the disclosure in a first example embodiment.

The PV system comprises a PV generator 1, which comprises two PV sub-generators 2a, 2b. The two PV sub-generators 2a, 2b can each be formed, for example, by a plurality of PV modules connected in series, what is known as a string. Each of the PV sub-generators 2a, 2b can also comprise a plurality of strings connected in parallel. Each PV sub-generator 2a, 2b is connected via separate DC lines 3a, 3b to a likewise separate DC input 11a, 11b of an inverter 10. The DC inputs 11a, 11b lead in the inverter 10 to DC-DC converters 12a, 12b, the outputs of which are connected and lead to an inverter bridge 14. The inverter bridge 14 is here actuated and controlled by a control unit 15 of the inverter 10.

The area between the DC-DC converters 12a, 12b and the inverter bridge 14 is normally also called a DC link. It usually comprises an arrangement of one or more buffer capacitors 13, also referred to as DC-link capacitor(s) 13, in order to smooth the DC voltage in this DC link given the pulsed manner of drawing current in the conversion into AC power, and to increase the maximum peak current that can be drawn in one current-drawing pulse. The voltage in the DC link is referred to below as the DC-link voltage $U_{13}$.

An inverter 10 such as the one shown here is often also called a multistring inverter because it is designed for connecting independently a plurality of PV sub-generators, which are usually formed by strings. The DC-DC converters 12a, 12b, which may be boost converters and/or buck converters for example, can likewise be controlled by the control unit 15 of the inverter 10, normally independently of each other, wherein in particular it is possible to alter their voltage conversion ratio between the input 11a and 11b respectively and the output, which is connected to the inverter bridge 14 via the DC link. The PV sub-generators 2a, 2b can thereby be operated at operating points that have a different operating voltage. In this case, the operating point that is optimum in terms of generated power, which is also known as the MPP (maximum power point), is usually chosen as the operating point for each of the two sub-generators 2a, 2b.

The inverter 10 is connected via an AC output and an AC line 4 to an export meter 5, which is finally coupled to a power grid 6. The AC output of the inverter 10 and also the power grid 6 are shown to be three-phase by way of example. Of course a different number of phases is possible, in particular a single-phase embodiment of the inverter 10 and, if applicable, also of the power grid 6.

The number of two PV sub-generators 2a, 2b in the PV generator 1 is also merely by way of example. It is entirely possible that the inverter 10 comprises more than two DC inputs 11a, 11b and, if applicable, associated DC-DC converters 12a, 12b, and the PV generator 1 accordingly comprises more than the two PV sub-generators 2a, 2b shown. In this case, it is not essential that one DC-DC converter 12a, 12b is associated with each DC input 11a, 11b. It is also possible, for instance, that one of two PV sub-generators 2a, 2b is connected directly to the DC link and only the second PV sub-generator is connected via a DC-DC converter. In addition, FIG. 1 shows only those elements of the PV system that are essential to the application. For instance switching elements (for example isolators, contactors), filters (for example a sine filter), grid monitoring devices and/or transformer may be provided on the DC and/or AC side of the inverter 10.

One possible design of the DC-DC converter 12a, 12b is represented schematically in the example embodiment shown. The DC-DC converters 12a, 12b are here designed as boost converters, respectively comprising an inductor 121a or 121b connected on its output side in series with a diode 123a or 123b in the current path between the input 11a or 11b and the common DC link, and respectively comprising a switching element 122a or 122b, which connects the center tap between the inductor 121a or 121b and the diode 123a or 123b to a ground potential GND. The ground potential GND here means any reference potential that is not limited to, but may include, the ground (GND) potential. The switching element 122a, 122b is e.g. an IGBT (Insulated Gate Bipolar Transistor), a MOSFET (Metal Oxide Semiconductor Field Effect Transistor) or another suitable semiconductor switch. The switching element 122a, 122b is operated in switched mode, in which the switching period and the ratio between On period and Off period, also known as the duty cycle, determine the voltage conversion ratio of the DC-DC converter 12a, 12b.

According to the application, the inverter 10 comprises an expansion unit 20, which can be built into an enclosure of the inverter 10 or can be implemented as a separate unit. The expansion unit 20 comprises an additional DC-DC converter 22, which, depending on the design of the PV system, so for instance depending on the voltages of the PV sub-generators 2a, 2b, can be designed as a boost converter, a buck converter or a combined buck-boost converter, In the present example embodiment, it is assumed that the additional DC-DC converter 22 is a buck converter.

The output from the additional DC-DC converter 22 leads to a local electrical load, either directly to a local DC load 7 or via an optional inverter bridge 24, shown dashed in the figure, to a local AC load 8. An additional DC link comprising an additional DC-link capacitor 23 is formed in parallel with the output of the additional DC-DC converter 22. The voltage in the additional DC link is referred to below as the additional DC-link voltage $U_{23}$.

On the input side, the additional DC-DC converter 22 in the present example embodiment is connected via switches 21a and 21b to the DC-DC converters 12a, 12b respectively. For this purpose, each of the DC-DC converters 12a, 12b comprises an additional diode 124a and 124b respectively, which like the respective diodes 123a and 123b is connected to the corresponding inductor 121a, 121b. The cathode of the diode 123a and 123b forms an output 125a and 125b respectively of the DC-DC converter. The additional diodes 124a and 124b each add an additional output 126a and 126b respectively to the DC-DC converters 12a, 12b, wherein a reverse current flow from the common DC link comprising the DC-link capacitor 13 to these additional outputs or in the opposite direction from these additional outputs to the common DC link is prevented. The switches 21a, 21b can be connected before the additional DC-DC converter, as shown here. It is also possible to integrate the switches 21a, 21b in the additional DC-DC converter 22.

Using the PV-system design shown, the energy from the PV generator 1 can be distributed into different paths, either via the inverter bridge 14 into the power grid 6 or via the additional DC-DC converter 22 to the local electrical load 7, 8 connected in parallel with the additional DC link. This is done by setting the conversion ratios of the DC-DC converters 12a, 12b and the additional DC-DC converter 22 in a synchronized (coordinated) manner and setting the switches 21a, 21b correspondingly. The coordination is achieved by the control unit 15 of the inverter 10 also controlling the expansion unit 20 and in particular the components thereof such as the additional DC-DC converter 22 and the switches 21a, 21b via the control connection 16.

By supplying the local electrical load, either the DC load 7 or, via the additional inverter bridge 24, the AC load 8, the power fed via the export meter 5 into the power grid 6 can be reduced or taken to zero, and it is thereby possible to respond to any throttle-down request from an energy supplier.

In this case, the power supplied from one of the PV sub-generators 2a, 2b can be directed selectively into the additional DC link, whereas the power supplied from the other of the PV sub-generators 2a, 2b continues to be fed into the power grid 6. Alternatively, the power from the entire PV generator 1 can be fed into the additional DC link without any feed-in to the power grid 6.

To direct the power flow into the additional DC link, the relevant switch 21a and/or 21b is closed so that the additional DC-DC converter 22 is connected to the additional outputs of the DC-DC converter 12a and/or 12b. At the same time, the voltage conversion ratio of the relevant DC-DC converter 12a, 12b that is connected to the additional DC-DC converter 22 is set such that its output voltage is less than the voltage $U_{13}$ in the DC link comprising the DC-link capacitor 13. Taking into account the feed-in option, the minimum value of this voltage is set by the peak voltage of the power grid 6 and therefore cannot drop below a certain level. If the output voltage of one of the DC-DC converters 12a, 12b is less than the required DC-link voltage $U_{13}$, no power can flow into the DC link.

If the required voltage $U_{23}$ in the additional DC link is greater than the voltage of the PV sub-generator 2a or 2b that is meant to supply its power to the additional DC link, the corresponding DC-DC converter 12a, 12b in the form of a boost converter can be used to bring the voltage of the PV sub-generator 2a, 2b to the required voltage level. The additional DC-DC converter 22 in the form of a buck converter is not needed in this case and can either be deactivated (i.e. operated with a voltage conversion ratio of 1:1) or advantageously bypassed via a bypass switch, which is not shown here. Example embodiments of the expansion unit 20 are also possible in which the additional DC-DC converter 22 is not provided.

On the other hand, if the voltage at the relevant PV sub-generator 2a, 2b is greater than the required voltage $U_{23}$ in the additional DC link, the relevant DC-DC converter 12a, 12b can be deactivated and hence have a conversion ratio of 1:1. Adjusting the voltage to the (lower) voltage $U_{23}$ in the additional DC link is then achieved by operating the additional DC-DC converter 22 in step-down mode. In both operating modes, namely when the voltage of the PV sub-generator 2a, 2b is greater than the voltage $U_{23}$ or when it is smaller than the voltage $U_{23}$, only one of the two DC-DC converters is actively needed, either the boost converter 12a or 12b or the additional buck converter 22. Corresponding power losses hence arise only once, and the loads connected to the additional DC link are supplied in the most energy-efficient manner possible (i.e. with minimum possible power loss).

In one embodiment of the disclosure, this diversion of power into the additional DC link can be performed without interruption over a certain time period. In another embodiment, however, the power can also be directed first into the DC link then into the additional DC link multiple times, effectively in an alternating manner, within the certain time period.

The disclosure also includes the option of controlling the diversion of the power flow into the additional DC link according to the charge level of the additional DC-link capacitor 23 of the additional DC link. In this case, the additional DC-link capacitor 23 is charged by a power flow from at least one of the PV sub-generators 2a, 2b to an upper threshold value of its additional DC-link voltage $U_{23}$. The power flow into the additional DC link comprising the additional DC-link capacitor 23 is then interrupted by appropriate control of the DC-DC converters 12a, 12b and of the additional DC-DC converter 22, and also of the switches 21a, 21b if applicable, and the power is directed again into the DC link comprising the DC-link capacitor 13.

As a result of the power drawn by the local loads connected to the additional DC link, the additional DC-link voltage $U_{23}$ falls. When the voltage drops below a lower threshold value for the voltage $U_{23}$, the power flow from the at least one of the PV sub-generators 2a, 2b is directed again into the additional DC link and the additional DC-link capacitor 23 is charged again. The additional DC-link voltage $U_{23}$ can thereby be held within a tolerance band that is defined to be suitable for supplying connected local loads.

In one embodiment of the disclosure, the power flow from a PV sub-generator 2a, 2b, at least for a certain time period, is directed either only into the common DC link comprising the DC-link capacitor 13 or only into the additional DC link comprising the additional DC-link capacitor 23. In this case, the power from a PV sub-generator 2a, 2b accordingly flows selectively either entirely into the common DC link or entirely into the additional DC link. The power flow from the PV sub-generator 2a, 2b is converted at most only once irrespective of whether it is directed into the common DC link or into the additional DC link. Thus the power flow from the PV sub-generator 2a, 2b, once it has arrived in the common DC link or in the additional DC link, has experienced at most only one DC/DC conversion and therefore has only minimum conversion losses.

In another embodiment of the disclosure, however, it is also possible to direct the power flow from a PV sub-generator 2a, 2b simultaneously both into the common DC link and into the additional DC link, if applicable in different proportions. This is the case, for example, when owing to incident radiation conditions, a DC-DC converter 12a, 12b allocated to a PV sub-generator 2a, 2b is deactivated, at least for a certain time period. In this case, the voltage of the PV sub-generator 2a, 2b equals the voltage drop across the DC-link capacitor 13 arranged in the common DC link, excluding the voltage drop across the diode 123a, 123b. With the switch 21a, 21b closed, however, power can now also flow simultaneously from the PV sub-generator 2a, 2b into the additional DC link comprising the additional DC-link capacitor 23. From here, the electrical power can supply a local DC load 7 and/or a local AC load 8. If applicable here, the voltage can be converted by the additional DC-DC converter 22 connected in front of the additional DC link. Again in this case, the power flow or the power-flow components from the PV sub-generator 2a, 2b is/are converted at most only once on the path into the common DC link and into the additional DC link. Thus again in this case each power flow component from the PV sub-generator 2a, 2b, once it has arrived in the common DC link or in the additional DC link, has experienced at most only one DC/DC conversion and therefore has only minimum conversion losses.

Advantageously, only one single conversion of the power flow components into the common DC link and into the additional DC link takes place irrespective of whether the power flow from a PV sub-generator 2a, 2b is directed selectively entirely into the common DC link or into the additional DC link, or whether it is directed simultaneously into the common DC link and into the additional DC link, if applicable in different proportions. In order to achieve just one conversion of surplus PV power, i.e. of the power flow component into the additional DC link, the control unit 15 activates at most only one DC-DC converter along the connection between PV sub-generator 2a, 2b and the additional DC link, i.e. activates either the DC-DC converter 12a, 12b or the additional DC-DC converter 22. An actively converting DC-DC converter is characterized by switched-mode control of the switching element of the DC-DC converter, i.e. for example of the switching element 122a, 122b of the DC-DC converter 12a and 12b respectively.

In addition, it is possible to redistribute power by the option of allowing energy to flow out of the additional DC link into the DC link. This is a useful option in particular when a high-capacity energy store, for example a rechargeable battery, is connected to the additional DC link. In order to allow power to flow from the additional DC link into the DC link, the additional DC-DC converter is designed as a bidirectional converter in the example embodiment of FIG. 1. The additional DC-DC converter 22 is connected on the opposite side from the additional DC link, which side then forms the output, via a switch 25 and a diode 17 to the DC link and the DC-link capacitor 13. It is also possible according to the disclosure that an actively controllable semiconductor switch is used instead of the diode 17, for example in order to reduce any power loss occurring when power flows from the additional DC link into the DC link. With the same consideration in mind, it is similarly also possible to replace each of the additional diodes 124a, 124b with an actively controllable semiconductor switch.

In the case described above, the power from only one PV sub-generator 2a, 2b was directed at least intermittently into the additional DC link comprising the additional DC-link capacitor 23. It is also possible according to the disclosure, however, by using the switches 21a, 21b and selecting a suitable conversion ratio for the DC-DC converters 12a, 12b, to direct the power from a plurality or all of the connected PV sub-generators 2a, 2b into the second DC link and hence to allow the supply of a local electrical load while the remaining connected PV sub-generators 2a, 2b, or none of same, feed power into the DC link comprising the DC-link capacitor 13 and hence into the power grid 6.

Figure 2:
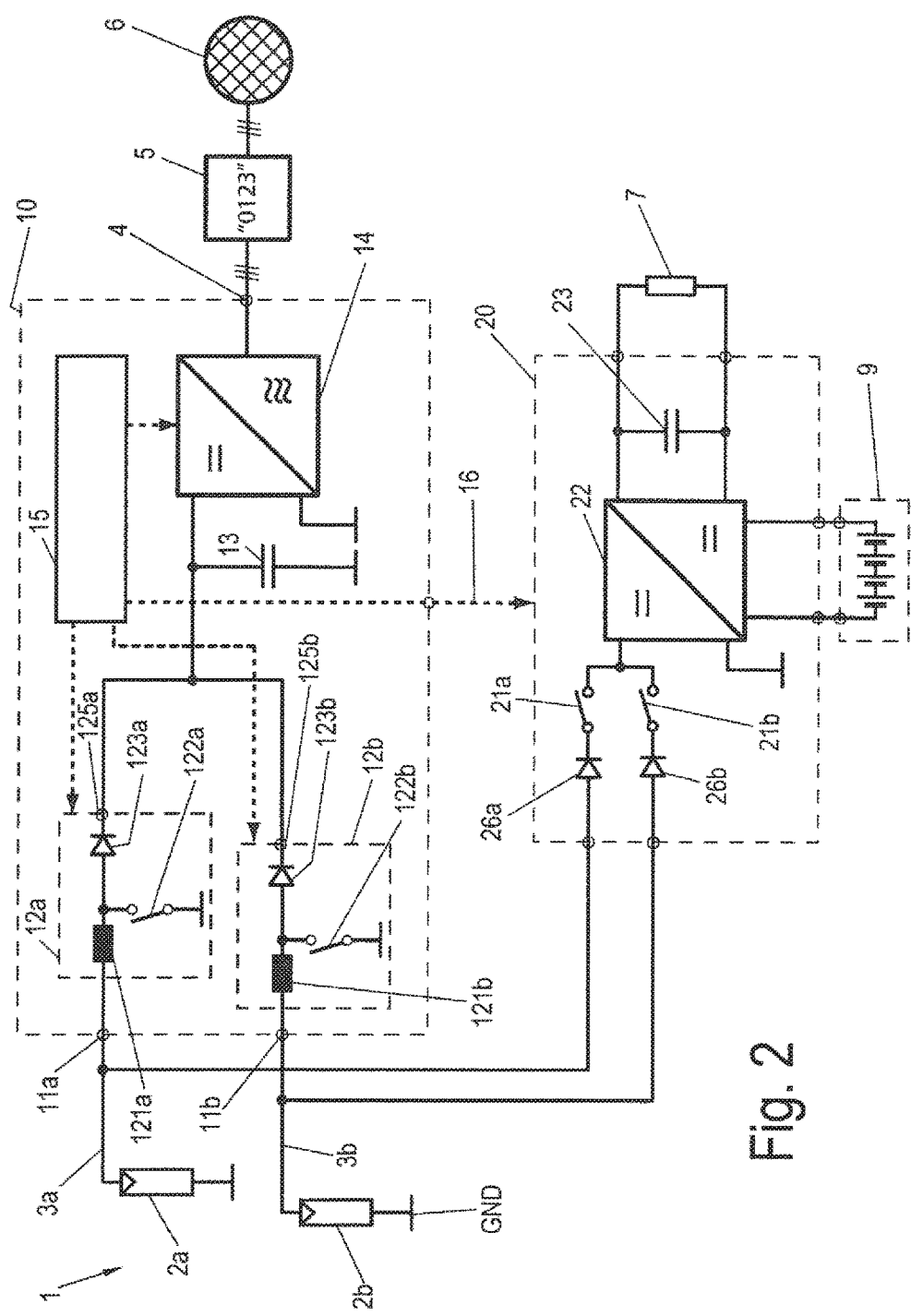
FIG. 2 is a schematic diagram of a PV system comprising an inverter according to the disclosure in another example embodiment.

FIG. 2 shows a PV system comprising an inverter 10 having an expansion unit 20 in another example embodiment. In this example, the same reference signs denote elements that are identical or have the same function to those in the first example embodiment.

In the first example embodiment, the design of the inverter 10 is already prepared for accommodating an internally arranged expansion unit 20 or for connecting to an externally arranged expansion unit 20, for example by the DC-DC converters 12a, 12b already providing additional outputs by means of the diodes 124a, 124b. In the example embodiment shown in FIG. 2, however, an expansion unit 20 is shown that can be used as a retrofit unit for an inverter 10 that has not been specifically prepared in terms of its connection facilities.

For the purpose of coordinated control of the components of the expansion unit 20 and of the inverter 10, however, there is again in this case a control connection 16, via which the expansion unit 20 is controlled by the control unit 15 of the inverter 10. The inverter 10 has been adapted to a certain extent for the expansion unit as regards the control connection 16. In this case, the control connection 16 can be implemented advantageously via a network port which exists anyway on the inverter 10. It can also be implemented wirelessly e.g. by radio, however. In the control unit 15, a control program can be adapted in a firmware update, and therefore it is ultimately possible to integrate the expansion unit 20 for the purpose of control without modifying the design of the inverter 10, in other words without making hardware changes.

In one example embodiment of FIG. 2, the expansion unit 20 is housed in a separate enclosure and not in an enclosure shared with the inverter 10. The expansion unit 20 again comprises an additional DC-DC converter 22 having switches 21*a*, 21*b* arranged on the input side thereof. The additional DC-DC converter 22 can be designed as a boost converter, as a buck converter or as a combined buck-boost converter. The additional DC-DC converter 22 is connected on the output side to an additional DC link comprising an additional DC-link capacitor 23 and to a DC load 7. The additional inverter bridge 24 with downstream connected local AC load 8, which is optional in FIG. 1, is not shown here, but can also be optionally present.

The additional DC-DC converter 22 in the present instance additionally comprises a charging device, which is connected to a battery 9 via additional outputs. The battery 9 serves as an energy store and can accordingly be charged via the additional DC-DC converter 22 when there is a surplus of power supplied by the PV generator 1, and can be used to supply the local DC load 7 if required, for instance when there is not enough PV energy. In an alternative to the case shown in FIG. 2, the battery 9 can also be connected via a suitable charging device or else simply via a switching mechanism directly to the additional DC link. It is also possible that the battery 9 is connected to an additional input of the inverter 10, which input is not shown here. Like the inputs 11*a*, 11*b*, this can be an input suitable for connecting a PV sub-generator and which leads internally via a DC-DC converter to the DC link. The energy stored in the battery 9 can thereby also be fed to the DC link of the inverter 10 or to another inverter (not shown here) and ultimately can be fed into the power grid 6.

The input of the additional DC-DC converter 22 is connected via the switches 21*a*, 21*b* to the PV sub-generator 2*a* and the PV sub-generator 2*b* respectively. Diodes 26*a*, 26*b* are arranged in the connection, which like the diodes 124*a* and 124*b* in the example embodiment of FIG. 1 prevent reverse current flows between the PV sub-generators 2*a*, 2*b* when both switches 21*a*, 21*b* are in the closed state. If the control of the switches 21*a*, 21*b* ensures that only one of the PV sub-generators 2*a*, 2*b* at a time is ever connected to the additional DC-DC converter, it is also possible to dispense with the diodes 26*a*, 26*b*.

An electrical heater or a circulating pump of a local water circuit can be used, for example, as the local AC or DC load 7, 8, into which load the electrical power supplied by the PV generator 1 can be fed via the additional DC-DC converter 22 if all or some of the electrical power is not meant to be fed into the power grid 6. When using a local electrical load that does not place high demands on the supply current and/or the supply voltage in terms of having a constant level and/or smoothing, for instance a heater, the additional DC link can also be implemented without the additional DC-link capacitor 23.

Again in the example embodiment shown in FIG. 2, the power flow or the power-flow components from a PV sub-generator 2*a*, 2*b* into the common DC link and into the additional DC link is/are converted at most only once. Unlike the case in FIG. 1, however, the DC-DC converters 12*a*, 12*b* and the additional DC-DC converter 22 can now be operated simultaneously, yet still each power flow component from the PV sub-generator 2*a*, 2*b*, once it has arrived in the common DC link or in the additional DC link, has experienced at most only one DC/DC conversion and therefore has only minimum conversion losses.

We claim:

1. An inverter comprising at least two DC inputs, which are coupled to a common DC link, which is connected to an inverter bridge, wherein at least one of the DC inputs is coupled to an additional DC link.

2. The inverter as claimed in claim 1, further comprising a DC-DC converter connected between at least one of the DC inputs and the common DC link.

3. The inverter as claimed in claim 2, wherein the DC-DC converter comprises two outputs, of which one output is connected to the common DC link and an additional output is connected to the additional DC link, and wherein the inverter is configured to selectively guide power to either the common DC link or the additional DC link.

4. The inverter as claimed in claim 1, wherein the additional DC link is arranged inside an enclosure of the inverter.

5. The inverter as claimed in claim 1, wherein the additional DC link is arranged in a separate enclosure as part of an expansion unit.

6. The inverter as claimed in claim 1, wherein the additional DC link is connected to the DC inputs via switches and/or diodes.

7. The inverter as claimed in claim 1, wherein the additional DC link is coupled to the at least one of the DC inputs via an additional DC-DC converter.

8. The inverter as claimed in claim 6, wherein the additional DC link is coupled to the at least one of the DC inputs via an additional DC-DC converter.

9. The inverter as claimed in claim 8, further comprising a control unit of the inverter configured to control the switches and/or the additional DC-DC converter.

10. The inverter as claimed in claim 8, wherein the additional DC-DC converter comprises a buck converter, a boost converter or a combined buck-boost converter.

11. The inverter as claimed in claim 2, wherein the DC-DC converter comprises a boost converter.

12. The inverter as claimed in claim 1, further comprising an additional inverter bridge that is connected downstream the additional DC link.

13. A PV system comprising an inverter, the inverter comprising at least two DC inputs, which are coupled to a common DC link, which is connected to an inverter bridge, wherein at least one of the DC inputs is coupled to an additional DC link, wherein the additional DC link is connected to a local electrical load and/or to an energy store.

14. The PV system as claimed in claim 13, wherein the additional DC link is connected to a DC load.

15. The PV system as claimed in claim 13, further comprising an additional inverter bridge, which is connected to a local AC load, connected downstream of the additional DC link.

16. The PV system as claimed in claim 14, further comprising an additional inverter bridge, which is connected to a local AC load, connected downstream of the additional DC link.

17. The PV system as claimed in claim 16, wherein the local DC load and/or the local AC load are an electrical heating element and/or an electrical circulating pump.

18. A method for controlling an inverter of a PV system, comprising:
coupling at least two DC inputs of an inverter to a common DC link, which is connected to an inverter bridge;
connecting at least one of the DC inputs, via a DC-DC converter, to the common DC link;

coupling at least one of the DC inputs, via an additional DC-DC converter, to an additional DC link configured to connect to a local electrical load;

directing a power flow from at least one of the DC inputs into the common DC link and/or into the additional DC link based on suitably coordinated control of the DC-DC converter and of the additional DC-DC converter.

19. The method as claimed in claim 18, wherein the power flow from the at least one of the DC inputs is directed selectively entirely either into the common DC link or into the additional DC link.

20. The method as claimed in claim 18, wherein the power flow from the at least one of the DC inputs is directed in equal or different proportions into the common DC link and into the additional DC link.

21. The method as claimed in claim 18, wherein directing a power flow comprises directing partial power flows from one of the DC inputs feed into the common DC link or the additional DC link only via one actively converting DC-DC converter or additional DC-DC converter at a time when the voltages at the DC inputs and at the common DC link or the additional DC link are different.

* * * * *